March 2, 1937. H. P. SMITH 2,072,139
CULTIVATOR ATTACHMENT FOR TRACTORS
Filed April 3, 1936 2 Sheets-Sheet 1
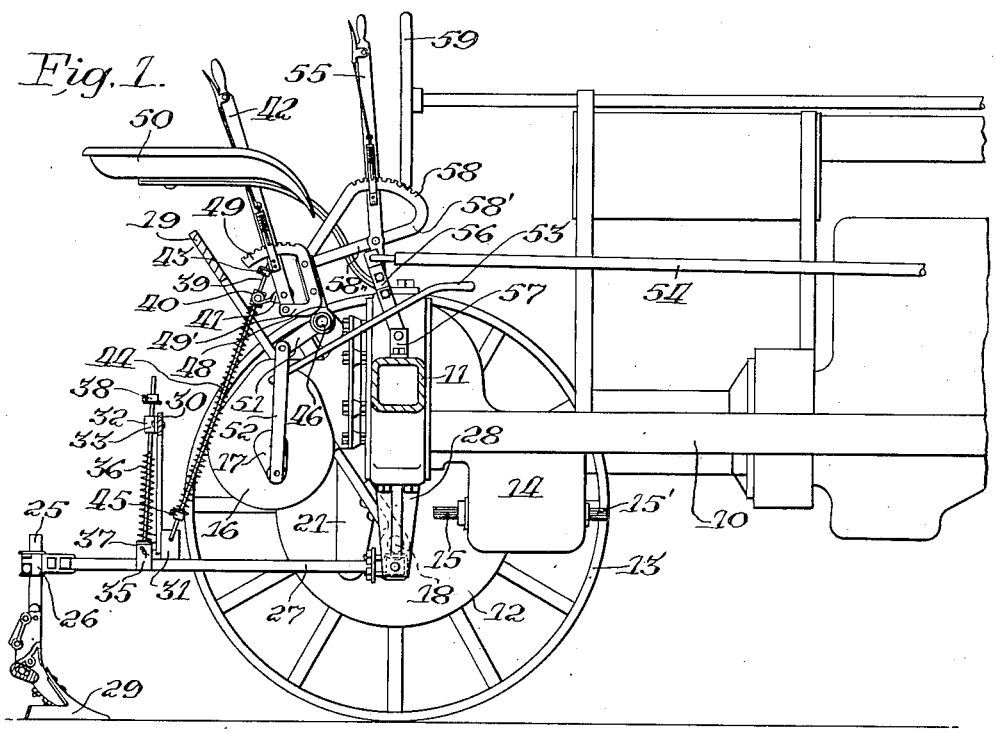
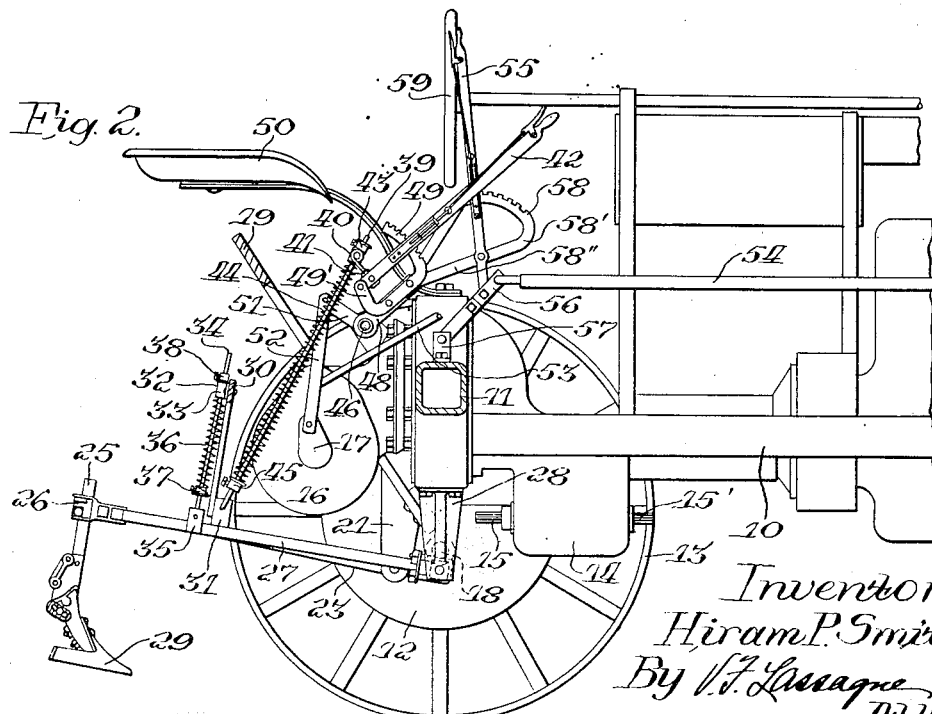
Inventor
Hiram P. Smith
By V. J. Lasagne
Atty.

March 2, 1937. H. P. SMITH 2,072,139
CULTIVATOR ATTACHMENT FOR TRACTORS
Filed April 3, 1936 2 Sheets-Sheet 2

Inventor
Hiram P. Smith
By V. F. Lassagne
Atty.

Patented Mar. 2, 1937

2,072,139

UNITED STATES PATENT OFFICE 2,072,139

CULTIVATOR ATTACHMENT FOR TRACTORS

Hiram P. Smith, Canton, Ill., assignor to International Harvester Company, a corporation of New Jersey Application April 3, 1936, Serial No. 72,625

15 Claims. (Cl. 97—47)

This invention relates to a cultivator attachment for tractors.

The principal object of the invention is to provide improved means for attaching implement, such as cultivators, to the rear of a tractor.

Another object is to provide such a means particularly adaptable for attaching implements for a tractor of the so-called row crop, arched axle type of construction.

Another object of the invention is to provide a power lift mechanism to raise and lower the front and rear tillage tools simultaneously from ground engaging to transporting position.

A more specific object of the invention is to provide a rear cultivator construction in which a jockey arch or bedding bar is adapted to raise and lower an implement frame.

These and other objects, which will be apparent from the detailed description to follow, are accomplished by a construction as shown in the drawings, in which:

Figure 1 is a side elevation of the rear end of a tractor of the general purpose type with the right wheel removed, showing the cultivator attachment in position with its lifting and lowering mechanism;

Figure 2 is a side elevation similar to Figure 1, showing the cultivator attachment in raised position;

Figure 3:
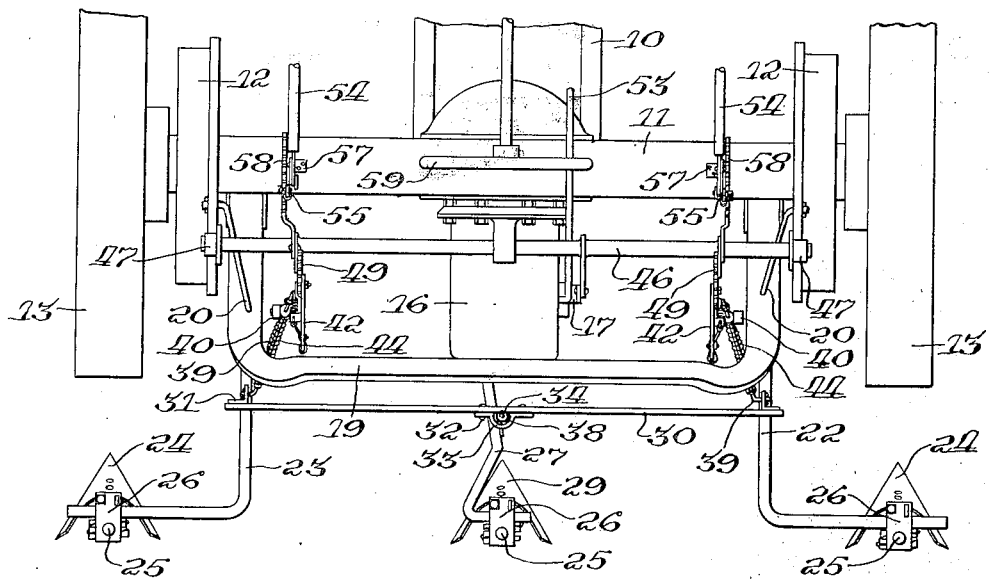
Figure 3 is a plan view of the cultivator attachment.

The tractor is of the well known construction having side frame members 10, a rear axle and differential housing 11, dependent housings 12 rigidly connected to the ends of the housings 11, and wheels 13 mounted on stub axles extending outwardly from the lower portions of the housings 12. A depending housing 14 forwardly of the rear axle housing 11 contains gearing connected to the tractor drive mechanism for operating a power take-off shaft 15 which extends centrally rearwardly from said housing under the axle housing 11 and may also have a forwardly projecting, splined power take-off shaft 15'. The power lift mechanism 16 is similar to that disclosed and claimed in assignee's copending application to A. C. Lindgren et al., Serial No. 644,982, filed Nov. 30, 1932. The power lift mechanism 16 is driven from the transmission of the tractor by a shaft extending through the differential housing which drives a suitable power lift mechanism of the one-half revolution clutch type for actuating intermittently the crank arm 17 of the power lift mechanism. The power lift mechanism 16 is supported at the mid-portion of the tractor from the differential housing 11.

The arched axle, or high clearance, construction, previously described, permits the use of the tractor for cultivating row crops.

Attached to the lower portions of the housings 12 and extending inwardly therefrom are the short stub shafts 18. The shafts 18 form means upon with the draw-bar 19 of the tractor is ordinarily attached. The draw-bar 19 is usually mounted in a horizontal position, but for the embodiment disclosed in this invention, it is elevated to the position shown in Figures 1, 3, and 4 and secured in its elevated position by the supporting braces 20 attached to the draw-bar and at their forward ends to the upper part of the depending housings 12.

Figure 4:
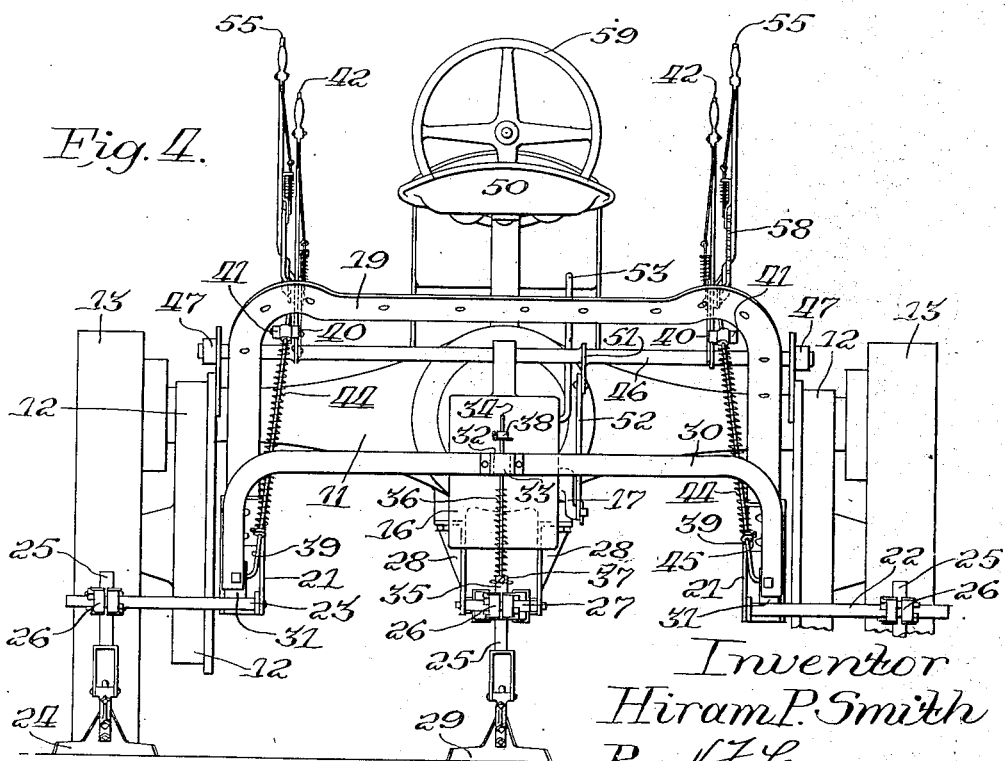
Figure 4 is a rear elevation of the cultivator attachment.

The cultivator beams forming a part of my invention extend rearwardly from the tractor and are so positioned to cultivate out the rear wheel tracks and the front wheel tracks. The cultivator beams, which extend rearwardly and laterally for supporting the shovels for cultivating out the tread left by the rear wheels, are attached for vertical movement at their front ends to depending brackets 21, which are secured to the forwardly extending legs of the U-shaped draw-bar 19. The rearwardly extending cultivator beams 22 and 23 are attached to the brackets 21 for vertical movement and extend laterally, as best shown in Figures 3 and 4, and have attached thereto the usual cultivator shovels 24, which are mounted on the cultivator standards 25 in the usual manner. The cultivator standards 25 are adjustable laterally and vertically by means of the adjusting clamps 26. The center cultivating beam 27 is pivotally mounted for vertical movement at the center of the tractor and is supported at its front end from depending supporting brackets 28 secured to the underneath portion of the differential housing 11. Cultivator beam 27 extends rearwardly and laterally and has a bent portion in its rearwardly extending portion to give rigidity thereto. The center cultivating shovel 29 is attached to the laterally extending portion of the cultivator beam 27 in the usual manner by the cultivator standard 25 and adjusting clamp 26. The laterally spaced cultivator beams 22 and 23 are connected together at their rear ends by an arched bedding bar 30. The arched bedding bar 30 is flexibly mounted to each cultivator beam 22 and 23 by the upstanding supports 31 welded, or otherwise secured, to the cultivator beams. The center cultivator beam is attached to the bedding bar 30 by a lost motion connection. The lost motion connection 32 comprises a slotted support 33 secured to the mid-portion of the arched member 30. The slotted support 33 is so adapted that the vertical pressure rod 34 is free for vertical movement. The lower end of the pressure rod 34 is pivotally connected to the center cultivator beam 27 by the support bracket 35 welded, or otherwise secured, thereto. For exerting pressure on the center cultivator beam, a compression spring 36 is mounted on the pressure rod 34, and it is adjusted by the collar 37. For adjusting the depth of the center cultivator beam, the adjusting collar 38 is mounted at the upper end of the pressure rod 34 and abuts against the slotted support bracket 33. The lost motion connection provided by the pressure spring and pressure rod permits of the free vertical movement of the center cultivator beam when an obstruction is encountered and also provides for the separate adjustment of the center cultivator beam.

The mechanism provided for raising and lowering the rear cultivator gang construction is similar to that disclosed and claimed in the applicant's copending application, Serial No. 72,624, filed April 3, 1936. In order to adjust the rear cultivator beams 22, 23 and 29, there are the usual spring pressure rods 39 pivotally connected at their lower ends to the brackets 31, which are attached to the implement beams 22 and 23. The spring pressure rods 39 are slidably mounted in the lost motion connections 40 pivotally connected to the brackets 41, which are attached to the adjusting levers 42. To limit the movement of the spring pressure rod 39, the adjusting collar 43 is attached to the upper end of the spring rod 39. For putting the spring 44 under pressure, there is the usual spring adjusting collar 45. Extending laterally across the rear of the tractor to the rear of the rear axle housing 11 is the transverse rockshaft 46, which is journaled in the brackets 47 attached to the depending housings 12. Welded, or otherwise secured, to the transverse rockshaft is the forwardly and upwardly extending lift arm 48 which has secured thereto the adjusting quadrant 49. The lever 42 is pivoted to a rearwardly and upwardly extending portion 49' of the adjusting quadrant 49. The lever 42 is adjusted and latched about the quadrant 49 by the usual thumb latch and detent construction. The adjusting lever 42 is within reach of the operator's station 50. The bracket 41, to which the pressure rod 39 is connected by the usual lost motion connection, is adjusted vertically by means of the hand lever 42 about the adjusting quadrant 49. As the adjusting levers 42 and their spring pressure adjusting mechanism for exerting pressure on the rear gangs are the same, only one adjusting hand lever and its corresponding mechanism has been described, and like reference characters denote similar parts. Extending rearwardly and welded to the rockshaft 46 is the power lifting arm 51 connected by the lifting link 52 to the crank arms 17 of the one-half revolution mechanism 16. The lever 53 for throwing the one-half revolution clutch mechanism in and out of operation extends upwardly within reach of the operator's station 50.

The lifting beams 54 at their rear ends are pivotally connected to their respective adjusting levers 55 positioned at each side of the tractor. The lifting levers 55 are pivotally mounted at their lower ends to a pivoted link 56, and the pivoted link is pivotally mounted at its lower end to the bracket 57, which is secured to the rear axle housing 11. The lifting beams 54 extend forwardly and are adapted to raise and lower implement frames connected at the front of the tractor, as disclosed in applicant's copending application previously referred to. As each adjusting lever 55 and its cooperating mechanism is the same for each side of the tractor, only one will be described, and like reference characters will denote similar parts. The adjusting lever 55 is pivoted to the adjusting quadrant 58 at the mid-portion of a rearwardly extending portion 58' of the adjusting quadrant 58. The rear portion of the adjusting quadrant 58 is pivotally connected to the lifting arm 48 at its upper end. The lever 56 is adjusted about the adjusting quadrant 58 by the usual thumb latch and detent. It is, therefore, seen that the length of the lifting beam between its connection to the lifting lever 55 and the adjusting arm 48 may be adjusted by the relative movement of the adjusting lever 55 with respect to the quadrant 58 and the connection of the lever to the pivoted link 56 to which the lifting beam 54 is connected. As the adjusting lever 55 is moved forwardly, the implement tools at the front of the tractor, and which are not shown, are adjusted upwardly from the ground engaging position, while, if the adjusting lever 55 is moved rearwardly, the ground engaging tools in their ground engaging position are lowered. The levers 55 are used to adjust the ground engaging tools on each side of the tractor in their working positions only and are not to be used for transporting. It is to be understood that the implement tools, which are positioned at the front of the tractor and which are not shown, may have spring pressure applied to them in the usual manner.

It is, therefore, obvious that, when the power lift mechanism is operated and the lifting arm 48 is actuated to move forwardly, the reciprocatory or oscillatory motion of this member is transmitted to the pivoted lever 55 by means of the lower portion of the adjusting quadrant 58'', which acts as a link between the lifting lever 55 attached to the pivoted member 56 and the lifting arm 48. Then, the reciprocatory motion of the lifting lever 55 is in turn transmitted to the lifting beams 54, which in turn causes the ground engaging tools attached to the front of the tractor to be raised or lowered, depending upon the forward or aft movement of the lifting arm 48.

It is also evident from the disclosure that, upon the actuation of the one-half revolution clutch to reciprocate or oscillate the lifting arm 48, the lifting lever 42, to which the pressure rods 39 are connected, is in turn given a fore and aft reciprocatory or oscillatory movement to effect the raising of the rear implement gangs to which the pressure rods are attached. As the arch member 30 connects the outer beams, by means of the lost motion connection and pressure rod 34, to the center beam 27, it is evident that, by the raising and lowering of the outer beams 22 and 23, the center beam 27 will likewise be raised and lowered. As either implement beam 22 or 23 is adjusted by the corresponding adjusting lever 42, it is evident that the center beam 27 will be adjusted proportionately to the amount that the beams 22 and 23 are adjusted; that is, as the beam 27 is connected at the center of the bedding bar 30, its adjustment vertically by the adjusting lever 42 will be one-half of that of the implement beam 22. Similarly, by adjusting the adjusting lever 42 at the other side of the tractor to adjust the beam 23, the center beam 27 will correspondingly be adjusted one-half the distance of the beam 23. It is, therefore, evident that, after both levers have been set for the required depth for the beams 22 and 23, the center beam 27 will be adjusted to the same depth as the beams 22 and 23.

As the adjusting levers 42 and 55 are positioned on each side of the tractor and are for the respective adjustments of the rear and front implement tools in their ground engaging position, it is obvious that the operator of the tractor can easily adjust either the forward or the rear tools, or one or the other of the implement beams of the fore and aft cultivator units. Therefore, it is obvious that any deviation in the depth of cultivation of each cultivator beam may be quickly adjusted. As the operator reaches the end of the row, he may raise and lower the cultivator gangs simultaneously by tripping the lever 53, which, in turn, releases a clutch of the one-half revolution type mounted in the housing 16 to raise or lower the cultivating beams from the ground engaging to the transporting position. As the clutch is of the one-half revolution type, the beams are either raised or lowered and locked in their respective positions at the end of each cycle of operation, and the clutch must be tripped for each raising or lowering of the implement tools. The tractor, as it travels down the field, is steered from the operator's station by the steering wheel 59, and, with some types of cultivator attachments, the motion of the steering wheel 59 is in turn transmitted to the forwardly mounted implement beams.

The operation of the tractor mounted implement will be clear from the following description. The longitudinally extending lifting beams 54, which are actuated by the power lift mechanism 16 through the lifting arm 48 and the adjusting lever 55, are operable to lift and lower the soil engaging units by means of the lifting beams 54 and the associated elements at each end thereof. The rearwardly positioned units are lifted and lowered by means of the lifting arm 48 connected to the power lift mechanism by means of the lifting arm 41 and the adjusting lever 42 and its associated parts, above described in detail. The operator of the tractor by independent operation of the levers 55 and 42 may selectively lift either the forwardly or the rearwardly positioned implements. This is a particularly advantageous feature under a great many conditions. For example, when an obstruction, such as a rock, is encountered, the front implements may be lifted to pass over the rock and then lowered into position. The rear implements may be operated in a like manner. However, if any slight obstruction is encountered, the ground engaging tools may free themselves because of the lost motion connection between the ground engaging tools and the lifting mechanism. Likewise, the rear implements may then be operated in a like manner. Another example of the utility of this construction is,—when cultivating row crops, it is desirable that both the rear and front implements be operated to the end of the row whenever possible. Whenever there is sufficient room for a tractor to maintain its forward movement, the forward implements may be lifted when the end of the row is reached. Subsequently, the rear implements may be lifted when said implements have reached the end of the row. The same procedure may be followed in a reverse manner on beginning the row. It is to be understood that for maximum transport position the power lift mechanism may be operated, which simultaneously raises and lowers the front and rear implement gangs, while the adjusting levers 42 and 55 are operable to lift only the cultivating implements from ground engaging position to a slight clearance above ground.

It is to be understood that applicant has shown and described only a preferred embodiment of his improved power lift attachment for tractor mounted implements and that he claims as his invention all modifications falling within the scope of the appended claims.

What is claimed is:

1. The combination with a motor propelled vehicle, of a plurality of implement gangs mounted on the front and rear ends of said vehicle for vertical movement, manually actuated means for adjusting the rear implement gangs separately, manually actuated means for adjusting the front implement gangs separately, said adjusting means for the front implement gangs comprising a reciprocatory member mounted on the vehicle and connected to the front implement gangs, an adjusting quadrant pivotally connected to said rear adjusting means, and an adjusting lever pivotally mounted on said adjusting quadrant and connected to said reciprocatory member; whereby, upon the operation of the adjusting lever the front implement gangs are adjusted.

2. The combination with a motor propelled vehicle, of a plurality of implement gangs mounted on the front and rear ends of said vehicle for vertical movement, a reciprocatory member mounted on said vehicle, manually actuated means for separately adjusting the rear implement gangs pivotally mounted on said reciprocatory member, manually actuated means for separately adjusting the front implement gangs, said adjusting means for the front implement gangs comprising a second reciprocatory member mounted on the vehicle and connected to the front implement gangs, an adjusting quadrant pivotally connected to said rear adjusting means, and an adjusting lever pivotally mounted on said adjusting quadrant and connected to said reciprocatory member; whereby, upon the reciprocation of the first reciprocatory member, the front and rear implement gangs are simultaneously raised or lowered.

3. The combination with a motor propelled vehicle, of a plurality of implement gangs mounted on the front and rear ends of said vehicle for vertical movement, a transverse rockshaft mounted on the vehicle for reciprocatory movement, manually actuated means mounted on said rockshaft for separately adjusting the rear implement gangs, manually actuated means for separately adjusting the front implement gangs, said adjusting means for the front implement gangs comprising a reciprocatory member mounted on the vehicle and connected to the front implement gangs, an adjusting quadrant pivotally connected to said transverse rockshaft, and an adjusting lever pivotally mounted on said adjusting quadrant and connected to said reciprocatory member; whereby, upon the reciprocation of the transverse rockshaft, the front and rear implement gangs are raised and lowered.

4. The combination with a motor propelled vehicle, of a plurality of implement gangs mounted on said vehicle for vertical movement, a transverse rockshaft mounted on the vehicle for reciprocatory movement, manually actuated means for separately adjusting the implement gangs, said adjusting means for implement gangs comprising a reciprocatory member mounted on the vehicle and connected to the implement gangs, and adjusting means interconnecting the transverse rockshaft with the reciprocatory member, whereby the implement gangs may be adjusted separately, and upon the reciprocation of the transverse rockshaft, the implement gangs are raised or lowered.

5. The combination with a motor propelled vehicle having a power lift mechanism operated from the motor, of a plurality of implement gangs mounted on the front and rear ends of said vehicle for vertical movement, a transverse rockshaft mounted on the vehicle for reciprocatory movement, manually actuated means mounted on said rockshaft for separately adjusting the rear implement gangs, manually actuated means for separately adjusting the front implement gangs, said adjusting means for the front implement gangs comprising a reciprocatory member mounted on the vehicle and connected to the front implement gangs, adjusting means connecting said transverse rockshaft and said reciprocatory member whereby the front implement gangs are adjusted and means connecting said transverse rockshaft to said power lift mechanism; whereby, upon the actuation of said power lift mechanism the front and rear implement gangs are simultaneously raised or lowered.

6. The combination with a motor propelled vehicle, of a cultivator attachment comprising outer and inner implement gangs mounted on said vehicle for vertical movement, a transverse bedding bar pivotally connected to the outer implement gangs, a lost motion connection connecting said inner implement gang to the transverse bedding bar, and adjusting means connected to the outer implement gangs, whereby, upon the adjusting of the outer implement gangs, the inner implement gang is adjusted.

7. The combination with a motor propelled vehicle, of a cultivator attachment comprising outer and inner implement gangs mounted on said vehicle for vertical movement, a transverse bedding bar pivotally connected to the outer implement gangs, means for connecting said inner implement gang to the transverse bedding bar, and a plurality of laterally spaced adjusting means mounted on said vehicle and connected to said outer implement gangs, whereby, upon the adjustment of each outer implement gang vertically, the inner implement gang is adjusted vertically an amount proportionally to the distance of the inner implement gang to the pivot of the transverse bedding bar about the outer implement gang not being adjusted and the distance of the transverse bedding bar between its pivots on the outer gangs.

8. The combination with a motor propelled vehicle, of a cultivator attachment comprising outer and inner implement gangs mounted on said vehicle for vertical movement, a transverse bedding bar pivotally connected to the outer implement gangs, pressure means for connecting said inner implement gang to the transverse bedding bar, and adjusting means mounted on said vehicle and connected to said outer implement comprising pressure means for exerting pressure on said outer implement gangs; whereby when pressure is exerted on said outer implement gangs, the aforesaid transverse bedding bar transmits the pressure exerted on said outer implement gangs to the inner implement gang.

9. The combination with a motor propelled vehicle, of a cultivator attachment comprising outer and inner implement gangs mounted on said vehicle for vertical movement, a transverse bedding bar pivotally connected to the outer implement gangs, a lost motion connection for connecting said inner implement gang to the transverse bedding bar, adjusting means for adjusting the aforesaid implement gangs comprising lost motion connections connecting the outer implement gangs to adjusting means whereby, each of the implement gangs is free to move vertically upon an obstruction being encountered.

10. The combination with a motor propelled vehicle having a power lift mechanism operated from the motor, of a cultivator attachment comprising outer and inner implement gangs mounted on said vehicle for vertical movement, a transverse bedding bar pivotally connected to the outer implement gangs, means for connecting the inner implement gang to the transverse bedding bar, adjusting means connected to the outer implement gangs, and means for connecting the adjusting means to the power lift mechanism whereby, upon the actuation of the power lift mechanism, all of the implement gangs are simultaneously raised or lowered.

11. The combination with a motor propelled vehicle having a power lift mechanism operated from the motor, of a cultivator attachment comprising outer and inner implement gangs mounted on said vehicle for vertical movement, a transverse bedding bar pivotally connected to the outer implement gangs, means for connecting the inner implement gang to the transverse bedding bar, a plurality of adjusting means laterally spaced and mounted for reciprocation, each of said adjusting means connected to a corresponding outer implement gang whereby the implement gangs are adjusted vertically separately, and means for connecting the adjusting means for the outer implement gangs whereby, upon the actuation of the power lift mechanism, all of the implement gangs are simultaneously raised or lowered.

12. The combination with a motor propelled vehicle, of a cultivator attachment comprising outer and inner implement gangs mounted on said vehicle for vertical movement, a transverse bedding bar pivotally connected to the outer implement gangs, means for connecting the inner implement gang to the transverse bedding bar, a plurality of adjusting means laterally spaced and mounted for reciprocation, each of said adjusting means connected to a corresponding outer implement gang whereby, as each of the outer implement gangs is adjusted vertically, the inner implement gang is adjusted a proportional amount so that upon adjusting each of the outer implement gangs the same amount, the inner implement gang is adjusted the same amount as the outer implement gangs.

13. The combination with a motor propelled vehicle having a power lift mechanism operated from the motor, of a cultivator attachment comprising outer and inner implement gangs mounted on said vehicle for vertical movement, a transverse bedding bar pivotally connected to the outer implement gangs, means for connecting the inner implement gang to the transverse bedding bar, a reciprocatory member, adjusting means pivotally mounted on said reciprocatory member, and connected to each of said outer implement gangs, and means for connecting the reciprocatory member to the power lift mechanism whereby, upon the actuation of the power lift mechanism, all of the implement gangs are simultaneously raised or lowered.

14. The combination with a motor propelled vehicle having a power lift mechanism operated from the motor, of a cultivator attachment comprising outer and inner implement gangs mounted on said vehicle for vertical movement, a transverse bedding bar pivotally connected to the outer implement gangs, means for connecting the inner implement gang to the transverse bedding bar, a transverse rockshaft mounted for reciprocatory movement, a plurality of adjusting means pivotally mounted on said transverse rockshaft and connected to each of said outer implement gangs, and means for connecting the transverse rockshaft to the power lift mechanism whereby, upon the actuation of the power lift mechanism, all of the implement gangs are simultaneously raised or lowered.

15. A cultivator attachment for a wheeled frame, comprising a plurality of outer and inner implement gangs, for pivotally mounting on said wheeled frame for vertical movement, a transverse bedding bar pivotally connecting the outer implement gangs, means for connecting the inner implement gang to the transverse bedding bar, adjusting means for mounting on said wheeled frame, means connecting said adjusting means to the outer implement gangs whereby upon the operation of the aforesaid adjusting means, each of the outer implement gangs may be adjusted vertically and the inner implement gang is adjusted an amount proportional to the vertical adjustment of each outer implement gang and measured by the ratio of the position of the inner gang on the transverse bedding bar to the length of the transverse bedding bar between its pivot points on the outer implement gangs.

HIRAM P. SMITH.